June 29, 1926.
F. SMITH
1,590,395
REBOUND DAMPER AND SHOCK ABSORBER FOR MOTOR ROAD VEHICLES
Filed Nov. 25, 1924    2 Sheets-Sheet 1
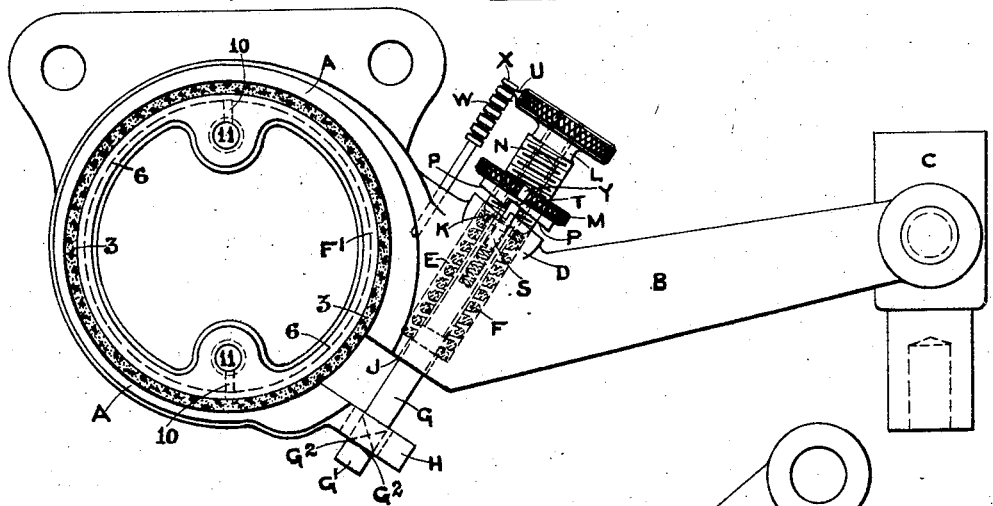
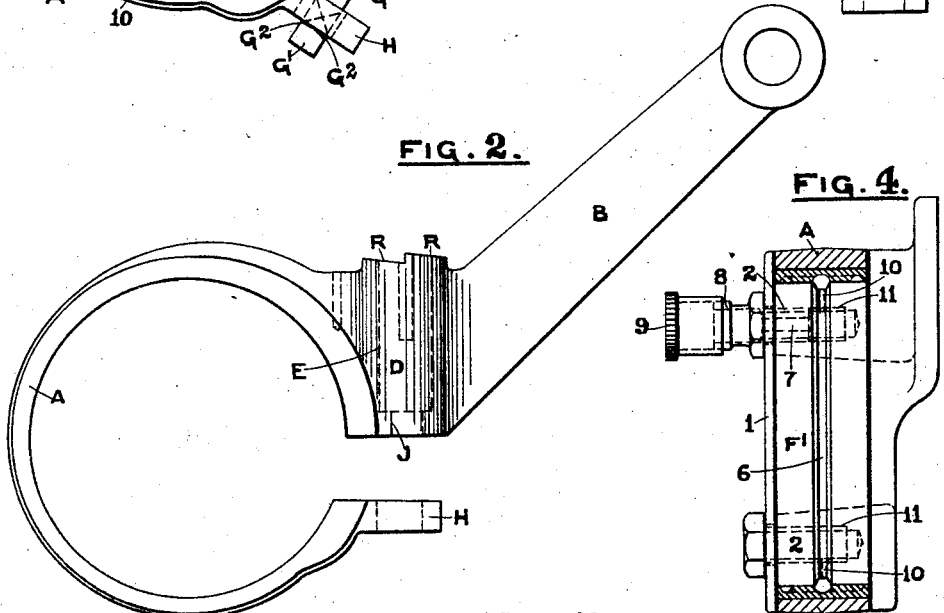
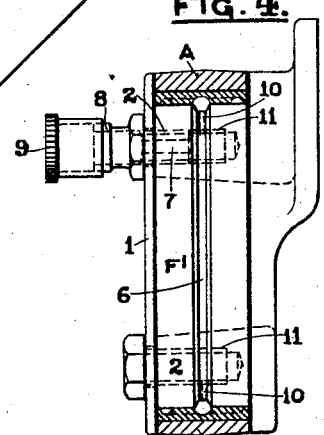
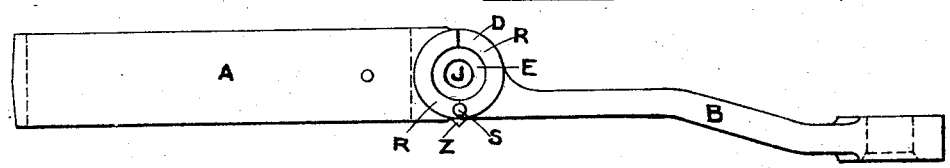
INVENTOR
Frank Smith June 29, 1926.
F. SMITH
1,590,395
REBOUND DAMPER AND SHOCK ABSORBER FOR MOTOR ROAD VEHICLES
Filed Nov. 25, 1924    2 Sheets-Sheet 2
FIG. 5.
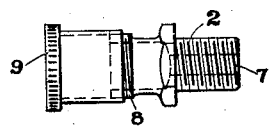
FIG. 6.                FIG. 8.
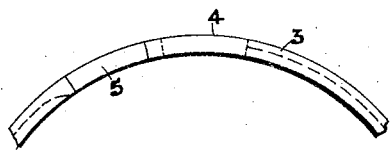    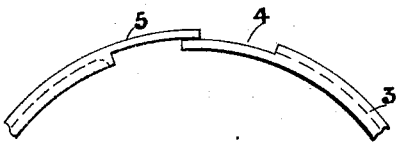
FIG. 7.                FIG. 9.
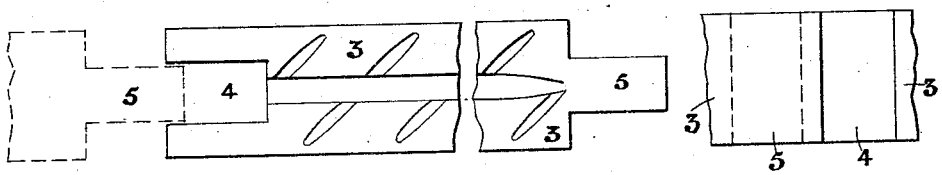
FIG. 10.    FIG. 11.    FIG. 12.    FIG. 13.
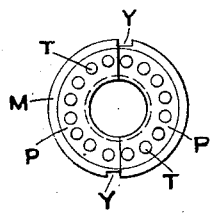  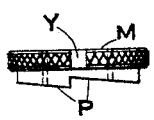  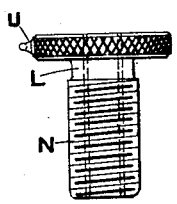  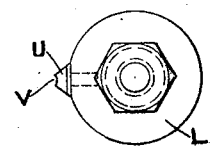
FIG. 14.
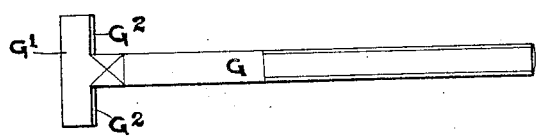
INVENTOR
Frank Smith
By Cushman, Bryant Darby
attys Patented June 29, 1926.

1,590,395

UNITED STATES PATENT OFFICE.

FRANK SMITH, OF ELLAND, ENGLAND.

REBOUND DAMPER AND SHOCK ABSORBER FOR MOTOR ROAD VEHICLES.

Application filed November 25, 1924, Serial No. 752,134, and in Great Britain January 21, 1924.

This invention relates to improvements upon the invention of my former Patent No. 1,464,142, and friction devices of this type; and my object is, by the employment of upon a brake-drum of a single brake-band connected with or forming a part of the lever operating same and means mainly housed in the said lever, to be able to put a separate and different restraining action upon the said spring during its compression movement, or its expansion movement, or for stiffening the spring equally in both directions thereof; the adjustment of the compression movement or for equally stiffening the spring, being effected without interference with the rebound movement; in no circumstances, however, can the stiffening of the spring on the compression movement exceed that already adjusted for the rebound or expansion movement.

In combination with the above-mentioned mechanism I provide a combined locking catch and indicator, whereby the adjustment of the rebound or expansion movement of all the laminated vehicle springs may be uniform and the amount of such adjustment indicated thereon.

In constructing my invention I also employ an improved form of brake-lining which is preferably fitted loosely within the brake-band in order that it may adapt itself to the wear and tear, prevent harshness in its grip, and the access of any undesirable matter entering between the gripping faces at the part where the ends of the said band converge.

According to the present invention, I preferably construct the brake-band and its operating lever in one piece, with the bore of said band eccentric thereto in order to proportionately strengthen the same where the strain put thereon is greatest. The lever is bossed or thickened at the heel or part where it joins the brake-band and is there bored and a recess formed therein adapted to receive the customary tension spring, and the screwed portion of the tension bolt, passed through the opposite end of the brake-band in the manner shown and described in my former patent aforesaid.

The spring within the recess is compressed to tighten the band about the brake-drum, by an internally and externally screw-threaded boss forming part of a nut screwing on to the aforesaid bolt and preferably into engagement with a loose washer thereon fitting against the end of the spring. A disc nut is screwed on to the boss of the former nut and has a notched or clutch face thereon comprising preferably two inclined planes in which are formed a series of dimples or recesses at spaced intervals, one of which is adapted to be engaged by a spring catch or stud housed in the lever, to lock the same after each adjustment. This nut, which has reference solely to the damping of the compression movement of the spring, is limited in movement to one-half a revolution only, on completion of which it is in engagement with the lever, and on being reversed it is held by the spring catch aforesaid. Indicators are provided upon both the nut and the lever for the purpose of showing the amount of adjustment effected at this part.

A projection, catch, or finger is formed upon or is secured to the nut screwing on to the tension bolt aforesaid which is adapted to engage one of a number of notches or annular grooves formed in a cylindrical indicator or head carried by a spindle whose opposite end is preferably housed in the brake-band, in order to ensure that the adjustment of the rebound movement of one of the vehicle springs may be uniformly or similarly effected in the rest of the said springs. A hexagon head may also be formed upon the said nut, if desired, to assist in the rotating of the nut.

My improved cork lining for the brake-band I construct of a length sufficient to wholly surround the brake-drum with the ends preferably joined together, by forming a kind of tenon projection upon one end which is adapted to fit into a corresponding recess formed in the other end of the said lining to form a complete sleeve. These ends are only partly in mesh when fitting the lining loosely within the brake-band so that said lining may adapt itself to the conditions of wear and tear in order that the grip thereof will not readily be impaired with use, but for this purpose, allow the ends to gradually approach during continued wear until they eventually become wholly enmeshed, so greatly prolonging the period of usefulness or duration thereof. As a modification I may connect the ends of the lining by means of a rebate joint as desired. This construction of lining closes the opening in the brake-band and prevents any undesirable matter gaining access to the gripping surface, as is the case where the lining only partly encompasses the brake-drum.

Further, in place of the oblique lubricant grooves on the gripping face of the lining continuing to the edge thereof permitting a continuous flow of lubricant from the longitudinal supply groove to the outside of the brake-drum, I discontinue such grooves a short distance from the sides of the band and so enclose the lubricant between the gripping surfaces from which it cannot escape except by exudation at the sides thereof.

In connection with my device for the purpose of supplying lubricant to the gripping faces, I preferably construct one of the bolts securing the cover-plate to the side of the brake-drum, with a central bore and form an extension thereof to receive the lubricant which is closed by a cap screwing thereon. An oil duct establishes communication between the bolt and the lubricant groove in the drum. The lubricator bolt may be secured at the top or the bottom of the drum as desired.

The arrangement of the brake-band upon the drum and its lever, is such as shown and described in my former patent, where normally no restraint is put upon the upward or compression movement of the vehicle spring, but the effect of screwing up the nut as aforesaid upon the brake-band is such as to proportionately increase the grip of such band upon the brake-drum and effect a corresponding restraining action on the vehicle spring during its expansion or downward movement.

When it is required to use the device as a rebound-damper only, that is, to effect a restraining action upon the expansion movement of a vehicle spring, and assuming the nut screwing on to the tension bolt is in the normal or neutral position or merely in engagement with the loose washer aforesaid or with the spring in the lever with the catch locked in the first or top groove in the indicator, as is clearly shown at Fig. 1; any further screwing up of the nut at once compresses the said spring and exercises through the lever and connections a corresponding restraining effect upon the laminated vehicle spring during its rebound or expansion movement. By giving the nut a complete revolution the catch will move down the indicator and into engagement with the next groove therein the side of which enters the dished end of the catch and locks the latter until again required to be moved. To correspondingly adjust the nut upon the device of each wheel will ensure the aforesaid restraining action being uniform upon the rest of the said vehicle springs, and no matter what amount of adjustment is made it can at once be seen on reference to the indicator, whether the adjustment of one spring is in agreement with the rest of the said springs.

When requiring to use the device for exercising a restraint or control upon the compression movement of the spring, the disc nut screwing on to the boss of the other nut may be given a turning movement within its limit, without interfering with the latter or its adjustment upon the rebound. This disc nut normally occupies a neutral position leaving a space between the two clutch faces but any lessening of the space by the rotation of the nut correspondingly limits the upward movement of the lever and the vehicle spring and exercises a restraining action thereon to that amount. Each adjustment of this nut is locked by the spring stud in the lever engaging one of the recesses in the clutch face thereof, whilst the return of the nut to the neutral position, or so as to cut out the restraint upon the compression movement, is effected within a half revolution thereof and it is prevented from exceeding this movement also by the spring stud aforesaid. By further tightening the disc nut on to the lever the action of the spring in the lever may be entirely cut out, then the restraint exercised upon the vehicle spring becomes equal in both directions, that is, the device now stiffens the spring equally in both directions of its movement. The stiffening on the compression movement however can under no circumstances be made to exceed that already exercised upon the rebound, and to increase this stiffening it is only necessary to still further tighten the nut compressing the spring in the lever. If desired, the clutch faces aforesaid may be dispensed with and flat contacting surfaces substituted, otherwise the manipulation and locking of the disc nut are as before described.

I attain these objects by the means illustrated in the accompanying drawings, in which:—

Fig. 1 is a front elevation of my improved rebound-damper and shock-absorber, showing the means for adjusting the restraining action upon the movements of the spring, occupying neutral positions; Fig. 2 is a similar view of the brake-band and lever employed therein; Fig. 3 is a plan view of Fig. 2; Fig. 4 is an end view of the brake-drum showing the brake-band and its lining in section, the cover plate attached, and the means for lubricating the gripping faces thereof; Fig. 5 is an elevation of the lubricator bolt employed for securing the cover-plate to the brake-drum; Figs. 6 and 7 are elevation and plan of the brake lining showing the construction of the oblique lubricant grooves therein, and in broken lines the manner of joining the ends of said lining; Figs. 8 and 9 are similar views showing a modification of joint in such lining; Fig. 10 is a plan view of the clutch face of the disc nut; Fig. 11 is an elevation of Fig. 10; Figs. 12 and 13 are elevation and plan of the nut screwing on to the tension bolt; Fig. 14 is an elevation of the tension bolt.

Similar letters refer to similar parts throughout the several views.

Referring to the drawings, A is the brakeband forming a part of the lever B mounted on a drum $F^1$ preferably bolted to the chassis, C is a ball-head coupling connected with the wheel axle or the like, D is the boss or thickened portion of the lever B, in which is a recess E containing the tension spring F. G is the tension bolt passing through the lug H of the band A in the well known manner and by means of the bore J into the recess E. The head $G^1$ of the bolt G has bevelled or rounded faces $G^2$ which operate to maintain a direct axial movement of said bolt and prevent frictional contact with the bore during compression of the spring F. K is a loose washer upon the bolt G, and L is a nut screwing upon the latter to compress the spring F and tighten the band A upon the drum $F^1$. M is a disc nut or the like screwing upon a boss N upon the nut L and having a clutch or inclined faces P thereon adapted to more or less engage corresponding parts R upon the lever B. S is a spring catch engaging one of the recesses T formed in the inclined faces of the nut M to lock the latter after each adjustment thereof. U is a finger provided with a dished recess V engaging a groove W in an indicator X housed or supported by the band A. Y are notches in the nut M and Z is an indicator upon the lever B the relative positions of which show the amount of restraint put upon the compression movement of the vehicle spring, or, when such restraint is removed and the said nut is in the neutral position, as shown at Fig. 1.

1 is the ordinary cover-plate and 2 are bolts securing the same to the drum $F^1$. 3 is the cork lining in which the oblique lubricant grooves therein only partly traverse the face thereof, 4 is a recess formed in one end of said lining with which more or less meshes the projection 5 upon the other end of the lining to form a complete sleeve of the latter; or the joint may be constructed as shown more clearly at Figs. 8 and 9. 6 is the usual lubricant groove in the brake-drum and, see Fig. 5, one of the bolts 2 has a longitudinal bore 7 therein communicating with a lubricant vessel 8 forming an extension of said bolt and 9 is a cap screwing on to said vessel for sealing same, whilst 10 are bores in the drum $F^1$ communicating with the bolt holes 11 in said drum and the groove 6, for circulating and distributing lubricant to the gripping faces of the device.

What I claim as my invention, and desire to secure by Letters Patent, is:—

1. A shock absorber for vehicles comprising a brake band, a lever forming a part of said band, brake lining within the band, a removable cover plate for said band and lining, means for securing the cover plate in position including a device for supplying lubricant to the brake lining, and means for adjusting the brake band.

2. A shock absorber for vehicles comprising a brake band, a lever forming a part of said band, brake lining within the band, a removable cover plate for said band and lining, means for securing the cover plate in position including a device for supplying lubricant to the brake lining, means for adjusting the brake band, and an indicator for positively determining the degree of adjustment of the brake band.

3. A shock absorber for vehicles comprising a brake band and lever construction, the band being provided with a cork lining having radially reduced overlapped end portions and provided on one face with a circumferential medial lubricant groove having at both sides a plurality of oblique extensions, for the purpose described.

4. A shock absorber for vehicles comprising a brake band having an eccentric bore, a lever at one end of the band provided with a recess, an apertured lug at the opposite end of the band, brake lining within the band, a bolt connected to said lug and extending through the recess in the lever, a spring surrounding the bolt within said recess, and means for varying the tension of said spring and adjusting the band relative to the brake lining.

5. A shock absorber for vehicles comprising a brake band, a lever forming an extension of said band at one end, the opposite end of the band being provided with an apertured lug, a T-bolt having its stem extending through said lug and lever and having its head provided with beveled faces engaging the lug, a spring surrounding the bolt within the lever, and a pair of concentrically arranged adjustment nuts associated with said bolt and spring for effecting adjustment of the brake band.

6. A shock absorber for vehicles comprising a brake band and lever construction, said lever being provided with a recess, brake lining associated with said band, means for adjusting the band comprising a bolt, a coil spring surrounding the bolt and positioned within the recess formed in the lever, and a pair of adjustment nuts associated with said bolt and coil spring for changing and maintaining the relative positions of the brake band and lining.

7. A shock absorber for vehicles comprising a brake band, a lever on said brake band having a recess therein, a brake lining within the band, and means for adjusting the brake band consisting of a bolt, a spring within the recess surrounding the bolt, and a pair of concentric nuts, one of which is provided with a portion extending into the recess for varying the tension of said spring.

8. The combination with a shock absorber for vehicles consisting of a brake band and lever construction, of a brake lining for said brake band, and means for adjusting the brake band comprising a bolt, a coil spring surrounding the bolt, a nut having an internally and externally screw-threaded boss, a second nut movable on said boss, indicating means associated with the brake lever, and means on said first mentioned nut co-operating with said indicating means for positively determining the degree of adjustment of the brake band.

9. A shock absorber for vehicles comprising a brake band, a lever having a recess therein forming a part of said band, the opposite end of the band comprising a lug having an opening therethrough, a T-bolt having a head provided with bevelled faces extending through said lug opening and said recess, the bevelled faces engaging said lug, a spring within the recess surrounding the bolt, a pair of concentrically arranged adjustment nuts associated with said bolt and spring for effecting adjustment of the brake band, and indicating means associated with said adjustment means for determining the degree of adjustment effected.

10. A shock-absorber for vehicles comprising a single brake-band, a lever forming a part of said band, a loosely fitting brake lining within the band having intermeshing ends adapted to increasingly engage each other to compensate for wear and tear of said lining, a removable cover plate for said band and lining, and means for securing the cover plate in position embodying a device for supplying lubricant to the brake lining.

11. A shock-absorber for vehicles comprising a single brake band, a lever forming a part of said band, a loosely fitting brake lining within the band having intermeshing ends adapted to increasingly engage each other to compensate for wear and tear of said lining, a removable cover plate for said band and lining, means for securing the cover plate in position embodying a device for supplying lubricant to the brake lining, and means for adjusting the brake band.

In testimony whereof, I have signed my name to this specification.

FRANK SMITH.